United States Patent [19]
Michiaels

[11] Patent Number: 5,586,753
[45] Date of Patent: Dec. 24, 1996

[54] FENCE VEGETATION BARRIER

[76] Inventor: William E. Michiaels, 204 Harrison Blvd., Valparaiso, Ind. 46383

[21] Appl. No.: 549,266

[22] Filed: Oct. 27, 1995

[51] Int. Cl.$^6$ ............................................. E04H 17/02
[52] U.S. Cl. .................... 256/32; 47/9; 52/102; 256/19
[58] Field of Search ................ 47/9, 25, 33; 52/102; 256/1, 19, 20, 32, 33

[56] References Cited

U.S. PATENT DOCUMENTS

| | | | |
|---|---|---|---|
| 3,393,897 | 7/1968 | Wright | 256/12 |
| 3,515,373 | 6/1970 | Abbe | 256/32 |
| 3,676,952 | 7/1972 | Watts | 47/33 |
| 3,806,096 | 4/1974 | Eccleston et al. | 256/32 |
| 3,822,864 | 7/1974 | Keys | 256/32 |
| 4,497,472 | 2/1985 | Johnson | 256/1 X |
| 4,548,388 | 10/1985 | Cobler | 256/32 |
| 4,690,382 | 9/1987 | Koperdak | 256/1 |
| 4,903,947 | 2/1990 | Groves | 256/32 |
| 5,178,369 | 1/1993 | Syx | 256/32 |
| 5,379,558 | 1/1995 | Mason, III | 47/9 |

FOREIGN PATENT DOCUMENTS

| | | | |
|---|---|---|---|
| 352225 | 1/1990 | European Pat. Off. | 47/33 |
| 1465465 | 1/1967 | France | 47/25 |
| 112662 | 1/1918 | United Kingdom | 47/25 |

*Primary Examiner*—Kenneth J. Dorner
*Assistant Examiner*—Andrea Chop
*Attorney, Agent, or Firm*—Gary M. Hartman; Domenica N. S. Hartman

[57] ABSTRACT

A vegetation barrier for the prevention of vegetation growth directly beneath and immediately around a fence. The barrier employs one or more barrier segments receivable beneath the lower edge of a fence. Each segment includes a first aperture disposed near one of its two longitudinal ends, and a second aperture disposed near the opposite longitudinal end of the segment. The apertures have different widths in the transverse direction, such that the segments are adapted to be used with fences constructed with posts having either of two sizes, such as the standardized sizes of about 1⅝ inches and about 2½ inches used in residential and commercial fence constructions. Multiple barrier segments can be installed on fences with differing spacing between posts by adjusting the amount of overlap between members.

20 Claims, 1 Drawing Sheet

FENCE VEGETATION BARRIER

This invention generally relates to barriers used with a fence to inhibit the growth of vegetation around the fence. More particularly, this invention is directed to a vegetation barrier that is adapted for use with different fence designs common in the industry.

BACKGROUND OF THE INVENTION

It is well known that fences of the type used in residential and commercial settings are susceptible to the growth of vegetation, such as weeds and grass, below their lower edges and around their support posts. This growth is generally considered to be aesthetically unappealing, and removal of this growth is time consuming and arduous work. Therefore, various barriers have been suggested for placement directly beneath the lower edge of a fence in order to inhibit vegetation growth, with each addressing to some extent the requirement that a suitable barrier be adaptive to the dimensional variability of such fences. For example, the spacing between the posts used to support a fence may differ based on preference or human error. Secondly, the external dimensions and shapes of the support posts often differ. While conventional round posts for chainlink fences are typically either 1⅝ inches or 2½ inches in diameter, larger or square posts may be preferred at the corners of the fence line in order to provide the additional support required. This high degree of variability has substantially frustrated attempts to create a standard barrier configuration that can be used with the majority of residential and commercial fences, such as chainlink fences.

For example, U.S. Pat. No. 3,806,096 to Eccleston et al. suggest a vegetation barrier that has a two-piece design including an outer shell and an inner core completely surrounded by the outer shell. The two-piece design allows for the outer shell to be telescopically displaced relative to the inner core such that the length of the barrier can be appropriately adjusted to the spacing between the fence posts. Though the barrier to Eccleston et al. allows for different distances between posts, it has several shortcomings. First, the portion of the inner core residing within the outer shell after installation serves no purpose, resulting in wasted material. Secondly, the outer shell receives and supports the inner core during and after installation, requiring that the outer shell be formed with sufficiently thick walls capable of supporting the weight of the inner core. Finally, a significant drawback of this barrier is its lack of adaptability to different post sizes and cross-sectional shapes. Though the barrier to Eccleston et al. provides a slot adapted to receive a pole, the slot is sized for a single post diameter, necessitating that the slot be widened by the installer in order to accommodate larger posts, while the use of smaller posts will undesirably form a gap with the post that permits vegetation growth between the slot and post. Furthermore, the barrier cannot be effectively employed to inhibit vegetation growth around corner posts due to the inability to overlap the outer shell or inner core of one section with that of an adjoining section of the barrier.

Another telescoping-type vegetation barrier is disclosed in U.S. Pat. No. 3,515,373 to Abbe. The barrier taught by Abbe lies flat under the fence to prevent the growth of vegetation in a manner similar to the barrier of Eccleston et al. Though use of Abbe's barrier does not result in material waste to the extent of Eccleston et al., significant shortcomings remain. Similar to Eccleston et al., Abbe's barrier does not allow for a single design to be securely attached to posts of differing sizes. Nor is Abbe's barrier well suited for use around corner posts for the same reasons stated for that of Eccleston et al. Further, the barrier is installed within a furrow, which greatly increases the labor required for installation.

Yet another telescoping barrier is disclosed in U.S. Pat. No. 3,822,864 to Keys. This barrier has a U-shaped cross-section that enables the gap between the lower edge of the fence and the ground to be reduced with a minimal amount of material. Though Keys's barrier has slots of identical widths but differing depths, the slots do not permit different post sizes to be accommodated, and therefore do not overcome the shortcomings of the barrier devices noted above. Furthermore, while Keys recognizes the necessity to accommodate corner posts, his solution is to employ specially shaped segments whose ends have a diagonal edge in order to allow the adjacent ends to abut along their edges. However, in doing so, Keys requires the use of specialized sections that complicate the manufacturing, ordering and installation of the barrier.

The difficulty with which a single barrier configuration can be designed for use as-manufactured to work with different post sizes and to be adapted for use with corner posts is apparent from the above. This difficulty is further evidenced by U.S. Pat. No. 3,393,897 to Wright, U.S. Pat. No. 4,497,472 to Johnson, U.S. Pat. No. 4,548,388 to Cobler, U.S. Pat. No. 4,903,947 to Groves, U.S. Pat. No. 5,178,369 to Syx and U.S. Pat. No. 5,328,156 to Hoke, all of which disclose vegetation barriers that do not accommodate different sized fence posts in the as-manufactured condition in a manner that optimizes ground coverage to prevent vegetation growth. Those skilled in the art will appreciate that, in view of the considerations noted above, a single barrier configuration that is sufficiently versatile to be usable with differing fence dimensions would be highly desirable. In particular, a barrier that allows for variability in post spacings and widths without resulting in gaps that permit vegetation growth between the barrier and fence posts would be desirable.

SUMMARY OF THE INVENTION

It is an object of this invention to provide a vegetation barrier for a residential or commercial-type fence, in which the barrier readily accommodates variable spacing between support posts of the fence.

It is a further object of this invention that such a barrier can be employed with fence posts having standardized cross-sectional dimensions.

It is another object of this invention that such a barrier can be produced to have a single base configuration that is adapted in the as-manufactured condition to be employed with essentially all fences using either of two standardized post sizes.

It is still a further object of this invention that such a barrier can be employed to inhibit vegetation growth around corner posts of a fence without modifications to the barrier during installation.

In accordance with this invention, a vegetation barrier is provided that prevents the growth of vegetation such as grass or weeds directly beneath and around a fence. The barrier can be installed either during the fence's original installation or anytime thereafter. Furthermore, the barrier is adaptable to differing distances between the support posts of the fence, which may occur between different fence constructions, and often within the same fence construction due to preference or error.

Generally, the vegetation barrier of this invention includes a barrier member receivable beneath the lower edge of a fence. The barrier member has a length in a longitudinal direction, a width in a transverse direction to the longitudinal direction, two oppositely-disposed ends in the longitudinal direction, oppositely-disposed edges in the transverse direction and running along the length of the barrier member, and a center disposed along the longitudinal direction and equidistant from the edges. A first attachment feature is disposed near a first of the two ends of the barrier member, and includes an aperture in communication with the first end. In addition, a second attachment feature is disposed near the second end of the barrier member, and includes an aperture in communication with the second end. Importantly, the aperture at the first end of the barrier member has a width in the transverse direction that differs from that of the aperture at the second end of the barrier member. As such, identical barrier members can be used to form a vegetation barrier for a fence constructed with posts having either of two standardized sizes, such as the standardized sizes of about 1⅝ inches and about 2½ inches used in residential and commercial chainlink fence constructions. Alternatively, one of the apertures can be shaped and sized to accommodate other types of posts, such as a standard 4×4 wood post having a width of about 3½ inches.

From the above, it is apparent that a significant advantage of this invention is that, when formed to have an appropriate length, a single barrier member can be used between adjacent posts of a fence though two different post sizes are present. Alternatively, and for the more typical circumstance, two identical barrier members can be placed in an overlapping manner to accommodate a greater spacing between adjacent posts. If identical posts are used, the barrier members are oriented such that the ends equipped with identically-sized apertures are oppositely disposed, with each post being received within its adjacent aperture. Alternatively, if different sized posts are positioned adjacent to each other, as may be the situation at the corner of a fence construction, the barrier members can be oriented such that the ends equipped with different-sized apertures are oppositely disposed. The ends of two barrier members positioned at a corner post are readily overlapped, such that a specially modified barrier member is not required to inhibit vegetation growth around a corner post.

In effect, barrier members of this invention can be manufactured to have a single base configuration, yet be adapted for use in a greater number of fence constructions because of their ability to be used with fence posts having one of two predetermined sizes. In that residential and commercial fence construction uniformly use two standardized post sizes, the vegetation barrier of this invention can be employed with nearly every fence construction in use. Advantageously, the ability to manufacture a single base configuration reduces production costs, since the production of identical products is less expensive than retooling the production line for each and every possible fence in existence. Furthermore, this aspect is also advantageous for consumers who can now confidently purchase a barrier system composed of identical barrier members that work with several different fences, in contrast to the prior art requirement of carefully purchasing a vegetation barrier system piece by piece, with some pieces requiring customization to accommodate differing post sizes.

Finally, the vegetation barrier of this invention can be installed during or after installation of a fence, with each fence post being received within an appropriately-sized aperture so as to securely restrain the barrier in place. Advantageously, the barrier does not require special fasteners for securement to the ground, fence or posts, nor does it require prior preparation of the ground beneath the fence.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
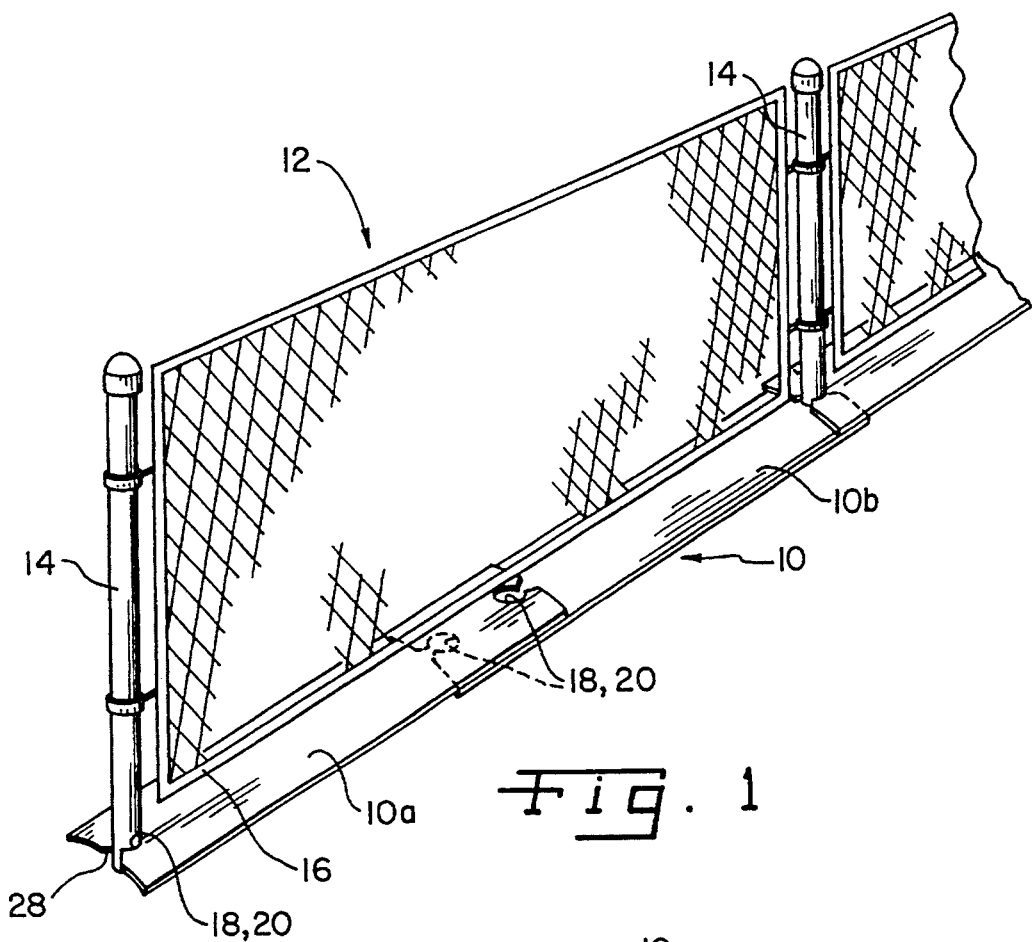
FIG. 1 is a perspective view showing two complete segments of a vegetation barrier in accordance with a preferred embodiment of this invention.

As seen in FIG. 1, a fence 12 is shown to include a series of vertical posts 14 that are spaced apart in order to provide the necessary structural support for the fence 16. In accordance with this invention, the fence 12 includes a vegetation barrier 10 positioned beneath the lower edge 16 of the fence 12 to prevent the undesirable growth of vegetation, such as grass and weeds, in close proximity to the posts 14 and lower edge 16.

As shown in FIG. 1, the vegetation barrier 10 is composed of substantially identical segments, two of which are shown as overlapping segments 10a and 10b. As such, the vegetation barrier 10 of this invention is designed to be telescopically displaced between the adjacent posts 14 of the fence 12, enabling the barrier 10 to form a reliable vegetation barrier between posts 14 spaced apart by a distance equal to the length of a single segment 10a or 10b, up to a distance equal to the combined lengths of the segments 10 and 10b. Accordingly, the barrier 10 can accommodate variations in spacing between the posts 14 of different fence constructions, as well as variations within the same fence 12 due to preference or error of the installer.

Figure 2:
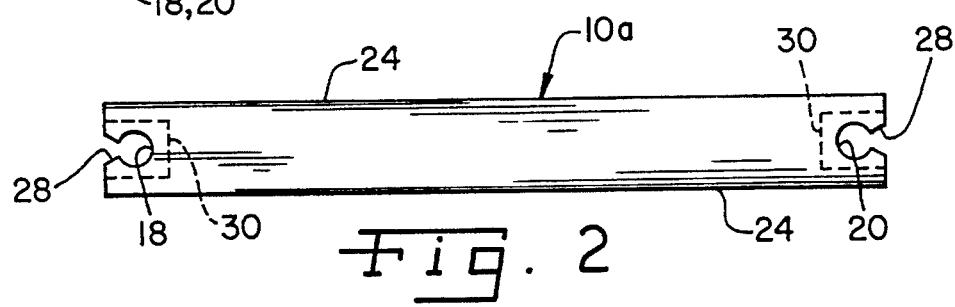
FIG. 2 shows a plan view of one of the segments of FIG. 1.
Figure 3:
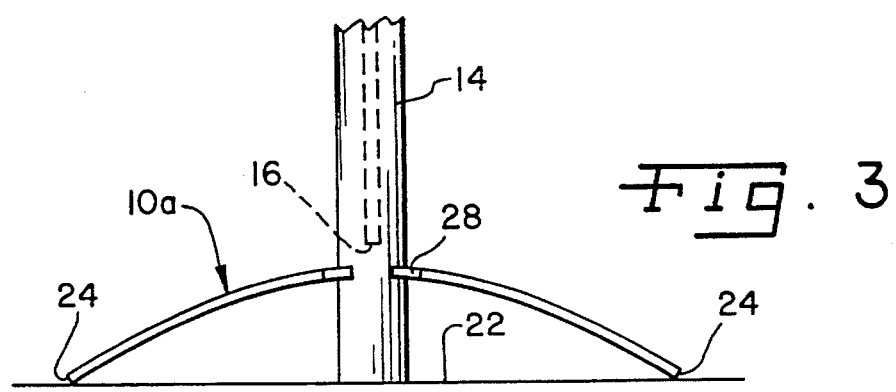
FIG. 3 shows an end view of one of the segments of FIG. 1.

The manner in which the barrier 10 is installed beneath the fence 12 can be more readily appreciated with reference to FIGS. 2 and 3. The segment 10a of the barrier 10 is shown in plan view in FIG. 2 as being representative of all segments required to form the barrier 10 shown in FIG. 1. As noted above, the segments that form the barrier 10 are substantially identical, meaning that their dimensions may differ as a result of manufacturing tolerances. A suitable length and width for the segment 10a are about six feet and about ten inches, respectively, though other lengths and widths could be used. The segment 10a is shown as including two differently-sized round apertures 18 and 20 that extend through the segment 10a at the opposing longitudinal ends of the segment 10a, enabling the segment 10a to be installed on fences that employ cylindrical posts 14 having either of two diametral widths.

According to a preferred aspect of this invention, the apertures 18 and 20 are specifically sized to closely receive posts 14 having the standardized widths of 1⅝ inches and 2½ inches for residential and commercial chainlink fence posts, though it is apparent that other widths and shapes for the apertures 18 and 20 would be used if a different post size were to become standardized. Furthermore, the shapes of the apertures 18 and 20 could be other than circular. For example, the apertures 18 and 20 could have a square or rectangular shape in order to be compatible with 4×4 wood posts having a standardized width of about 3½ inches. Yet another alternative shown in FIG. 2 is to form a square-shaped perforation or cutting guide 30 at each end of the segment 10a in order to enable an installer to quickly modify a segment equipped with circular apertures.

Because only one of the apertures 18 or 20 is specifically sized for any given one of the posts 14, each post 14 is received within an appropriately-sized aperture 18 or 20 in a manner that minimizes any gap between the post 14 and aperture 18 or 20, and therefore provides an optimal barrier to vegetation growth around the post 14. In addition, the close match between the widths of the post 14 and aperture 18 or 20 ensures that the segment 10a is securely nested with the post 14, such that the vegetation barrier 10 can rely solely on the posts 14 for its secure installation beneath the fence 12. The installer simply engages the correct aperture 18 or 20 of each segment 10a and 10b with one of the posts 14. In a preferred embodiment, each aperture 18 and 20 is spaced longitudinally inward from its respective end of the segment 10a as seen in FIG. 2, and communicates with its adjacent end of the segment 10a with a tapered slot 28 whose minimum transverse width is less than that of its corresponding aperture 18 and 20, as shown in FIG. 2. As such, during installation each post 14 is inserted into its corresponding aperture 18 or 20 by being forced through the tapered slot 28 adjoining the aperture 18 or 20, such that the segment 10a thereafter resists removal from the post 14. To enable the posts 14 to pass through the tapered slots 28 without causing permanent deformation, the segment 10a is preferably formed from a material that exhibits a degree of resiliency. Many suitable polymeric materials are known and available that achieve this object.

FIG. 3 represents an end view of the segment 10a after installation on its corresponding post 14. As shown, the segment 10a preferably has an arcuate shape, such that only the lateral edges 24 of the segment 10a engage the surface 22 of the ground beneath the fence 12. As a result, the transverse center of the segment 10a, at which the apertures 18 and 20 are located as shown, is elevated above the ground surface 22. While the degree to which the segment 10a is arched can vary considerably, a suitable configuration is for a chord defined between the edges 24 to be spaced a distance of about one-half inch from the center of the segment 10a, such that the center of the segment 10a is elevated about one-half inch above the ground surface 22 after installation. In doing so, the gap between the lower edge 16 of the fence 12 and the segment 10a is minimized, while the edges 24 of the segment 10a are directed into the ground surface 22 so as to provide a more stable base for the segment 10a.

As is apparent from FIG. 1, the second segment 10b is installed prior to installing the segment 10a, such that the segment 10a overlaps a portion of the segment 10b. The degree of overlap will depend entirely on the distance between the adjacent posts 14. A length of about six feet for each segment 10a and 10b is advantageous to enable the barrier 10 to be installed on a majority of fence constructions, accommodating post spacing of between about six and about twelve feet. With the appropriate apertures 18 or 20 of the segments 10a and 10b engaged with their respective posts 14, the remaining aperture 18 or 20 of the segment 10b is concealed by the segment 10a. If installed at a corner post (not shown), the adjacent ends of the segments 10a and 10b can be readily overlapped, such that specially modified segments having diagonal edges are not required to inhibit vegetation growth around the corner post.

In view of the above, it can be appreciated that a significant advantage of this invention is that the vegetation barrier 10 is adapted to be easily installed on an existing fence or a fence under construction. Furthermore, rather than being secured with a supplemental attachment component, the barrier 10 is uniquely equipped with apertures 18 and 20 and tapered slots 28 that secure the barrier 10 to posts of a fence. Once in place, the barrier 10 prevents undesirable vegetation growth by reducing the amount of light and water available to the soil and any vegetation beneath the barrier 10. If so desired, the barrier 10 can be readily removed for maintenance or replacement in the same manner as it was originally installed.

Another advantage of this invention is that the apertures 18 and 20 can be specifically sized to closely receive cylindrical posts 14 having either of the standardized widths of about 1⅝ inches and about 2½ inches for residential and commercial chainlink fence posts. Alternatively, the apertures 18 and 20 could have a square or rectangular shapes in order to be compatible with standardized wood posts. Because residential and commercial fence constructions uniformly use the two standardized post sizes noted above, the vegetation barrier 10 can be employed with nearly every fence construction in use. In effect, the segments that form the vegetation barrier 10 of this invention can all be identically manufactured to have two standardized aperture sizes, yet be adapted for use in numerous fence constructions because of their ability to be used with fence posts having either one of the two standardized post sizes. Advantageously, the ability to manufacture a single base configuration for the segments reduces production costs, since the production of identical barrier segments is less expensive than tooling the production line to produce specially adapted segments for each and every possible fence in existence. Furthermore, this aspect is also advantageous for consumers, who need only determine the number of identical barrier segments required for a given fence construction.

While our invention has been described in terms of preferred embodiments, it is apparent that other forms could be adopted by one skilled in the art, such as by incorporating the novel features of this invention within a vegetation barrier that differs in appearance from that shown in the Figures. Accordingly, the scope of our invention is to be limited only by the following claims.

What is claimed is:

1. A fence vegetation barrier for use with a fence having a pair of spaced-apart posts and a lower edge extending therebetween, the fence vegetation barrier comprising:

barrier means receivable beneath the lower edge of the fence, the barrier means having a length in a longitudinal direction, a width in a transverse direction to the longitudinal direction, two oppositely-disposed ends in the longitudinal direction, oppositely-disposed edges in the transverse direction and running along the length of the barrier means, and a center disposed along the longitudinal direction and equidistant from the edges;

first attachment means disposed near a first end of the two oppositely-disposed ends of the barrier means, the first attachment means comprising a first aperture in communication with the first end, the first aperture having a first aperture width in the transverse direction; and second attachment means disposed near a second end of the two oppositely-disposed ends of the barrier means, the second attachment means comprising a second aperture in communication with the second end, the second aperture having a second aperture width in the transverse direction that is less than the first aperture width;

wherein the first and second apertures are each entirely disposed between the edges of the barrier means and substantially at the center of the barrier means at the first and second ends, respectively.

2. A fence vegetation barrier as recited in claim 1 wherein the first and second apertures each extend through the barrier means and are spaced longitudinally inward from the first and second ends, respectively, of the barrier means.

3. A fence vegetation barrier as recited in claim 1 wherein the first aperture width is about 2½ inches and the second aperture width is about 1⅝ inches.

4. A fence vegetation barrier as recited in claim 1 wherein the first aperture width is about 3½ inches.

5. A fence vegetation barrier as recited in claim 1 wherein the barrier means has an arcuate shape in the transverse direction.

6. A fence vegetation barrier as recited in claim 5 wherein a chord defined between the edges of the barrier means is spaced a distance of about ½ inch from the center of the barrier means.

7. A fence vegetation barrier as recited in claim 1 wherein the first attachment means further comprises a first slot connecting the first aperture with the first end, the first slot having a first slot width in the transverse direction that is less than the first aperture width.

8. A fence vegetation barrier as recited in claim 7 wherein the second attachment means further comprises a second slot connecting the second aperture with the second end, the second slot having a second slot width in the transverse direction that is less than the second aperture width.

9. A fence vegetation barrier as recited in claim 1 wherein the first aperture width is a maximum transverse width of the first aperture and the second aperture width is a maximum transverse width of the second aperture.

10. A fence vegetation barrier for use with a fence having a pair of spaced-apart posts and a lower edge extending therebetween, the fence vegetation barrier including barrier means receivable beneath the lower edge of the fence, the barrier means comprising:

a barrier member having a length in a longitudinal direction, a width in a transverse direction to the longitudinal direction, two oppositely-disposed ends in the longitudinal direction, oppositely-disposed edges in the transverse direction and running along the length of the barrier member, and a center disposed along the longitudinal direction and equidistant from the edges, the barrier member having an arcuate shape in the transverse direction;

first attachment means disposed near a first end of the two oppositely-disposed ends of the barrier member, the first attachment means comprising a first aperture and a first slot connecting the first aperture with the first end, the first aperture having a first aperture width in the transverse direction and the first slot having a first slot width in the transverse direction that is less than the first aperture width; and second attachment means disposed near a second end of the two oppositely-disposed ends of the barrier member, the second attachment means comprising a second aperture and a second slot connecting the second aperture with the second end, the second aperture having a second aperture width in the transverse direction and the second slot having a second slot width in the transverse direction that is less than the second aperture width, the second aperture width being less than the first aperture width and the second slot width being less than the first slot width.

11. A fence vegetation barrier as recited in claim 10 wherein the first and second apertures have a circular shape.

12. (Amended) A fence vegetation barrier as recited in claim 11 wherein the first aperture width is about 2½ inches and the second aperture width is about 1⅝ inches.

13. A fence vegetation barrier as recited in claim 10 wherein at least one of the first and second attachment means further comprises a square-shaped cutting guide formed at one of the two oppositely-disposed ends of the barrier member.

14. A fence vegetation barrier as recited in claim 10 wherein the first aperture width is about 3½ inches.

15. A fence vegetation barrier as recited in claim 10 wherein the barrier means is formed from a polymeric material.

16. A fence vegetation barrier as recited in claim 10 wherein each of the first and second slots has a tapered portion that tapers inward toward the first and second apertures, respectively.

17. A fence vegetation barrier as recited in claim 10 wherein the first aperture width is a maximum transverse width of the first aperture and the second aperture width is a maximum transverse width of the second aperture.

18. A fence vegetation barrier as recited in claim 10 in combination with a fence, the fence having a pair of spaced-apart posts and a lower edge extending therebetween, the center of the barrier member being disposed below and aligned with the lower edge of the fence, one of the pair of spaced-apart posts of the fence being received in the first aperture of the barrier member.

19. A fence vegetation barrier as recited in claim 18 wherein the barrier means is a first barrier means, and wherein the fence vegetation barrier further comprises a second barrier means substantially identical to the first barrier means such that the second barrier means comprises:

a second barrier member having two oppositely-disposed ends in the longitudinal direction;

a first aperture and a first slot connecting the first aperture with a first end of the two oppositely-disposed ends of the second barrier member; and a second aperture and a second slot connecting the second aperture with a second end of the two oppositely-disposed ends of the second barrier member, a second of the pair of spaced-apart posts being received in the second aperture of the second barrier member.

20. A fence vegetation barrier comprising:

a fence having a pair of spaced-apart posts and a lower edge extending therebetween;

at least one barrier member positioned beneath the lower edge of the fence, the at least one barrier member having a length in a longitudinal direction, a width in a transverse direction to the longitudinal direction, two oppositely-disposed ends in the longitudinal direction, oppositely-disposed edges in the transverse direction and running along the length of the barrier member, and a center disposed along the longitudinal direction and equidistant from the edges, the at least one barrier member having an arcuate shape in the transverse direction such that the center of the at least one barrier member has a higher elevation than the edges of the at least one barrier member;

first attachment means disposed near a first end of the two oppositely-disposed ends of the at least one barrier member, the first attachment means comprising a first aperture and a first slot connecting the first aperture with the first end, the first aperture having a first maximum aperture width in the transverse direction and the first slot having a first minimum slot width in the transverse direction that is less than the first maximum aperture width; and second attachment means disposed near a second end of the two oppositely-disposed ends of the at least one barrier member, the second attachment means comprising a second aperture and a second slot connecting the second aperture with the second end, the second aperture having a second maximum aperture width in the transverse direction and the second slot having a second minimum slot width in the transverse direction that is less than the second maximum aperture width, the second maximum aperture width being less than the first maximum aperture width and the second minimum slot width being less than the first minimum slot width.

* * * * *